US006290796B2

(12) United States Patent
Furst et al.

(10) Patent No.: US 6,290,796 B2
(45) Date of Patent: Sep. 18, 2001

(54) METHOD OF MANUFACTURING A MULTI-PAGE BOOKLET WITH A REMOVABLE INSERT FROM A SINGLE SHEET

(75) Inventors: Lawrence A. Furst, Baltimore; James R. Monaco, Conowingo, both of MD (US)

(73) Assignee: Lucas-Insertco Pharmaceutical Printing Company of Maryland, Baltimore, MD (US)

( * ) Notice: Subject to any disclaimer, the term of this patent is extended or adjusted under 35 U.S.C. 154(b) by 0 days.

(21) Appl. No.: 09/760,788

(22) Filed: Jan. 17, 2001

Related U.S. Application Data

(62) Division of application No. 09/249,168, filed on Feb. 12, 1999.

(51) Int. Cl.[7] .................................................... B32B 31/00

(52) U.S. Cl. .......................... 156/211; 156/227; 156/267; 156/290; 156/291; 281/2; 281/5; 283/61; 283/62

(58) Field of Search .................................... 156/211, 227, 156/267, 290, 291; 281/2, 5; 283/61, 62, 81; 428/40.1

(56) References Cited

U.S. PATENT DOCUMENTS 3,920,267 11/1975 Lyon, Jr. ................................ 281/16
5,458,374 10/1995 Vijuk et al. ............................ 283/81
5,685,530 11/1997 DeLise .................................. 270/37

FOREIGN PATENT DOCUMENTS 2309491 5/2000 (CA) .

*Primary Examiner*—Sam Chuan Yao
(74) *Attorney, Agent, or Firm*—Rothwell, Figg, Ernst & Manbeck

(57) ABSTRACT

A new form of printed material, referred to herein as a booksert, provides printed information concerning commercial products, such as drug products and the like. The booksert is preferably formed from a single sheet of material that is printed, folded, glued and trimmed to form a multi-page booksert. The booksert can also include a removable insert.

14 Claims, 12 Drawing Sheets

METHOD OF MANUFACTURING A MULTI-PAGE BOOKLET WITH A REMOVABLE INSERT FROM A SINGLE SHEET

This application is a division of application Ser. No. 09/249,168, filed on Feb. 12, 1999.

BACKGROUND OF THE INVENTION

1. Field of the Invention

The present invention relates generally to printed material and to methods of manufacturing printed material. The present invention relates more specifically to printed material having printed information concerning drugs or other commercial products.

The present invention provides a new form of printed material, referred to herein as a booksert, having substantial benefits over existing printed materials, and especially useful in conjunction with drug products and other commercial products.

2. Description of the Background Art

Printed materials for providing printed information related to commercial products, such as warnings, instructions, etc., are known. Known printed materials include booklets (e.g., with stapled bindings), package outserts and package inserts.

An exemplary package outsert, for example, is shown in U.S. Pat. No. 5,458,374 for a UNIVERSAL NON-JAMMING MULTI-PLY MULTI-FOLD OUTSERT WITH COMPACT PERIPHERAL EDGES (AND RELATED METHOD), which is made from a single sheet of stock material having printed information. Single sheet inserts or outserts are typically awkward to handle and/or to read. As a result, users may not be able to nor desire to read information printed thereon, even important information related to drug products or the like.

Known booklets also have a number of drawbacks. Typically, they are complicated to manufacture. They can also be difficult to print upon or may have less room for copying. In addition, booklets having stapled bindings can be problematic in that staples can scratch users, items, and the like.

While a variety of booklets, inserts and outserts are known, existing printed materials have a number of limitations and drawbacks. There remains a continued need in the art for new and improved printed materials and, in particular, for new and improved printed materials for use with drug products and other commercial products, as well as for new and improved methods of manufacturing such printed materials.

SUMMARY OF THE INVENTION

The present invention involves a novel form of printed material, referred to herein as a booksert, and a method of manufacturing such a booksert which overcomes the above and other limitations of existing booklets, inserts and outserts.

The present booksert is preferably formed from a single sheet of material that is glued, folded, and trimmed to form a multi-page booksert. The booksert can be used, for example, for printed information related to drugs or other commercial products. The booksert can also include a removable insert, such as a coupon, a rebate form, a business reply card or another removable item.

According to a first aspect of the invention, a method of manufacturing a booksert is provided which includes the steps of: providing a single generally rectangular sheet of material; providing a glue strip within a first region of the sheet; folding a second region of the sheet without the glue strip with respect to the first region over a first fold-line such that the first and second regions overlap one another and are adhered together along the glue strip; trimming the booksert along the first fold-line; and folding the booksert over an axis through the glue strip.

According to another aspect of the invention, the method may include: providing a second glue strip within a third region of the sheet; folding the third region of the sheet over a second fold-line such that the first, second and third regions overlap one another and are adhered together; and trimming the booksert along the second fold-line.

According to another aspect of the invention, the method may include: folding a third region of the sheet over a second fold-line such that the first, second and third regions overlap one another; trimming the booksert along the second fold-line; the third region being unattached to the first and second regions after the steps of trimming to form a removable insert.

According to another aspect of the invention, a method of manufacturing a booksert having a removable insert is provided which includes the steps of: providing a single generally rectangular sheet of material, the sheet having at least three generally equal-size regions; providing a glue strip along a first of the regions; folding a third of the regions with respect to a second of the regions over a first fold-line such that the second and third regions overlap one another but are not adhered to one another; folding the second region with respect to the first region over a second fold-line such that the second region overlaps the first region and is adhered to the first region along the glue strip; trimming the booksert along the first and second fold-lines; and folding the booksert over an axis through the glue strip; whereby a booksert having a removable insert is created.

According to another preferred aspect of the invention, the booksert is further folded into a smaller final configuration. Preferably,the booksert is further folded over fourth and fifth fold lines. Preferably, a pressure sensitive adhesive is used to releasably maintain the booksert in its final configuration.

The above and other aspects, features and advantages of the invention will become clear from the following description of the preferred embodiments, taken in conjunction with the accompanying drawings.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

The present invention provides a unique form of printed material, referred to herein as a booksert, and method of manufacturing the same. The preferred bookserts described herein can be readily made with a single sheet of material without the use of staples or other complex structure. While various preferred embodiments are described below, other alternative embodiments can be made using principles of the present invention.

Figure 3:
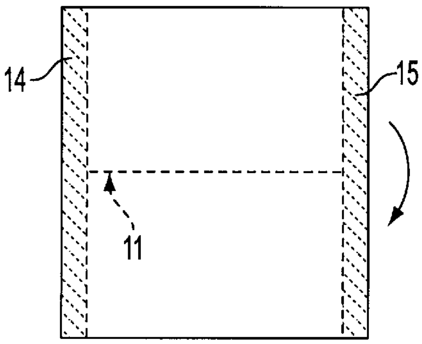
FIG. 3 is a top plan view of the sheet shown in FIG. 2 after folding the sheet at a second fold-line.
Figure 4:
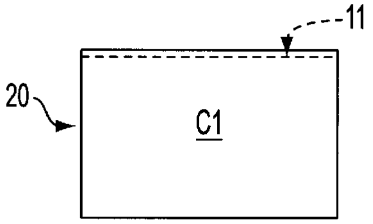
FIG. 4 is a top plan view of the sheet shown in FIG. 3 after trimming the edges of the sheet and folding the sheet about an axis through the glue strip forming the binding of the booksert.
Figure 5:
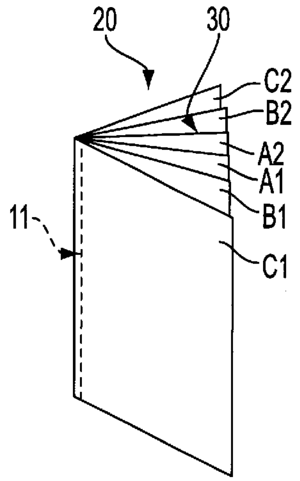
FIG. 5 is an elevational side view of the booksert shown in FIG. 4 with the glue strip at the left side of the figure.

FIGS. 1–5 show a preferred method of manufacturing a booksert according to a first aspect of the present invention, wherein a single rectangular sheet 10 with three approximately equal-size regions A, B and C is used to construct a multi-page booksert 20, FIG. 5, having a removable insert 30.

Figure 1:
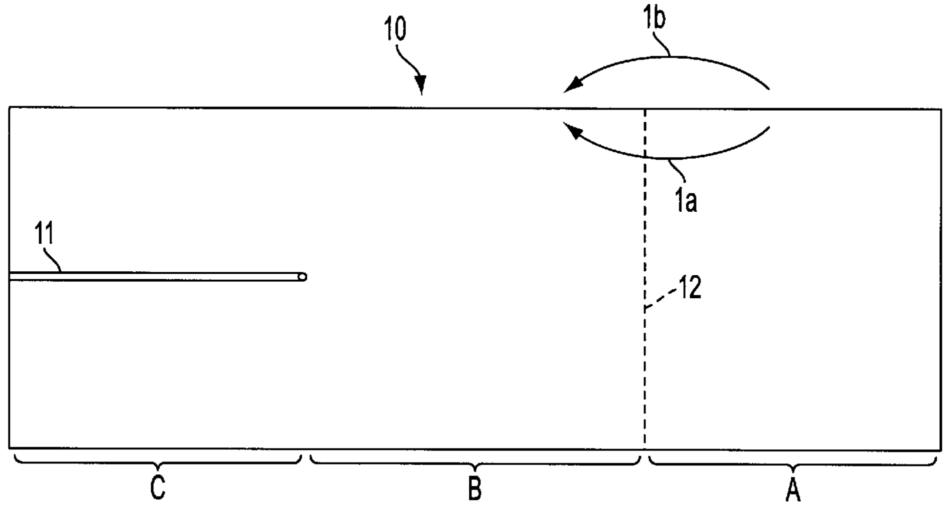
FIG. 1 is a top plan view of a sheet used to make a booksert according to a first preferred aspect of the invention.

First, a glue strip 11 is applied along a center of the region C. In FIG. 1, the glue strip 11 extends along about one third of the length of the upper surface of the sheet 10. The length and width of the glue strip can be varied as desired depending on circumstances. In one exemplary embodiment, the glue strip 11 can be about 3 mm wide and about 90 mm long.

Figure 2:
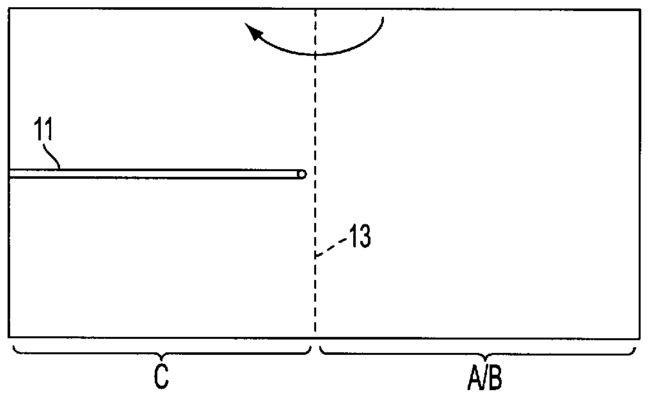
FIG. 2 is a top plan view of the sheet shown in FIG. 1 after folding the sheet at a first fold-line.

Second, the sheet 10 is folded at a fold-line 12 between the regions A and B. In FIG. 1, the fold-line 12 is located at a position about two thirds of the distance between the left and right ends of the sheet 10. As discussed below, the sheet 10 can be folded forwards (e.g., arrow 1*a*) or rearwards (e.g., arrow 1*b*). After this step, the product is configured as shown in FIG. 2 with regions A and B overlapping one another.

Third, the sheet 10 is folded at a fold-line 13 between the regions A/B and C. In FIG. 2, the fold-line 13 is located at a position about one half of the distance between the left and right ends of the sheet 10. At this stage, the product is configured as shown in FIG. 3 with all of the regions A, B and C overlapping one another. As also shown in FIG. 3, the glue strip 11 (shown with broken lines) along the region C thus adheres to the overlapping region there-above.

Fourth, the side edges 14 and 15 (shown in broken cross-hatching) are trimmed off to form the booksert. This trimming action separates the regions A, B and C by removing the connections along the fold-lines 12 and 13 to form separate sheets. This trimming action also ensures that the pages of the booksert are aligned along their edges. The amount of material removed in this trimming step can be varied as desired. In one exemplary embodiment, the width of the side edges 14 and 15 removed can be about ⅛ inch.

Fifth, the booksert is folded over the axis through the glue strip 11 to form the booksert 20 as shown in plan view in FIG. 4 with the glue strip 11 proximate the top side. FIG. 5 shows the booksert 20 in an upright position, with the glue strip 11 proximate the left side. The regions B and C which are glued together via the glue strip 11 create an integral booksert 20, while the non-glued interior region A creates a removable insert 30. The booksert 20 has eight pages, comprising the front and back surfaces of the portions C1 and C2 and B1 and B2, while the insert 30 has 4 pages, comprising the front and back surfaces of the portions A1 and A2.

As a result, a booksert 20 having a removable insert 30 is formed from a single sheet 10. The size and shape of the booksert can be selected as desired—e.g., by selecting an appropriately sized sheet 10.

Figure 6:
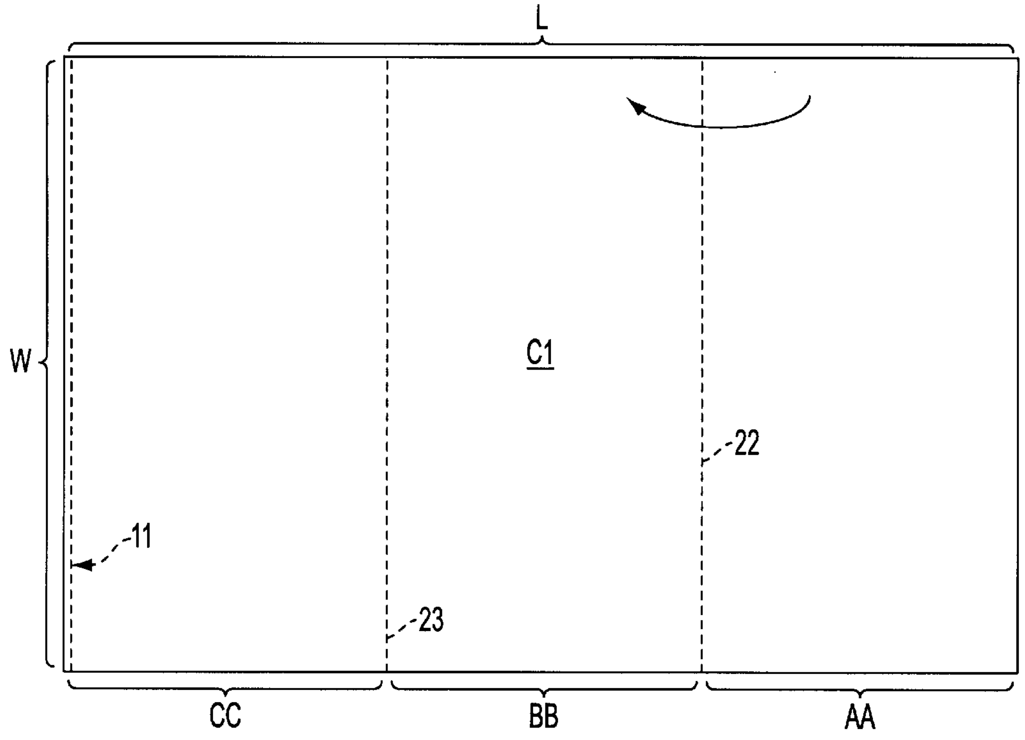
FIG. 6 is a top plan view of a booksert illustrating a second preferred aspect of the invention wherein the booksert is further folded into a compact final configuration.
Figure 7:
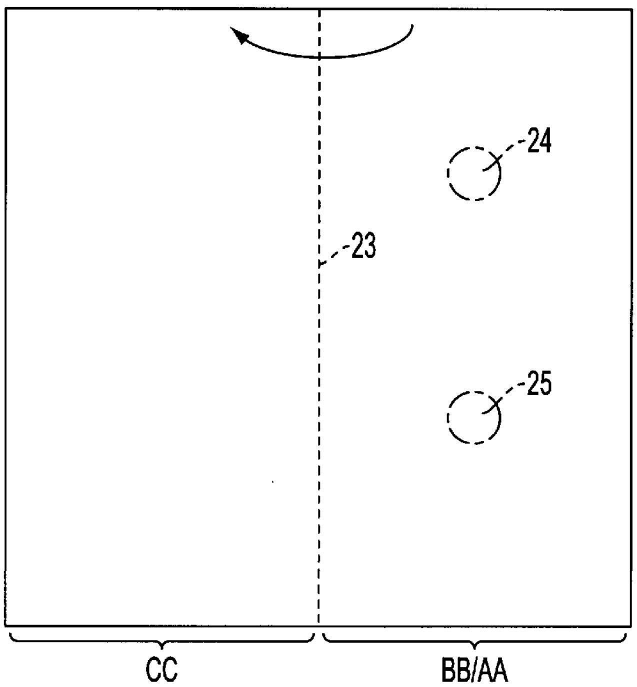
FIG. 7 is a top plan view of the booksert shown in FIG. 6 after folding the booksert over a fourth fold-line.
Figure 8:
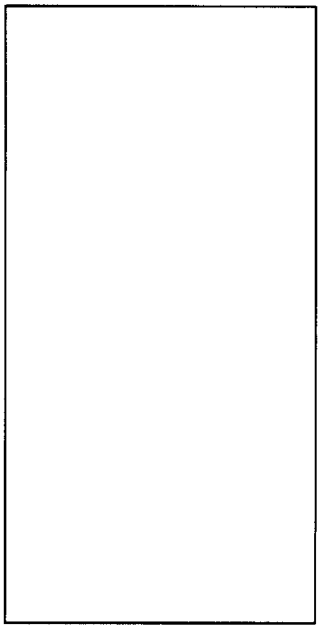
FIG. 8 is a top plan view of the booksert shown in FIG. 7 after further folding the booksert over a fifth fold-line.

FIGS. 6–8 show additional preferred steps of manufacturing the booksert according to a second preferred aspect of the invention. FIG. 6 shows a side view like that shown in FIG. 4, except that booksert is oriented with the glue strip 11 proximate the left side. In addition, the structure shown in FIG. 6 is like that shown in FIG. 4, except that the booksert shown in FIG. 6 has different dimensions. The booksert in FIG. 6 is configured such that the width W along the side containing the glue strip 11 is smaller than the length L. In one preferred embodiment, the width W is about 3–4 inches (preferably about 3 ½ inches) and the length L is about 5–6 inches (preferably about 5 ½ inches).

According to the second preferred aspect shown in FIGS. 6–8, the booksert 20 can be delineated by three approximately equal-size regions AA, BB and CC which are to be further folded with respect to each other to provide a compact and convenient final product.

First, the booksert 20 is folded at a fold-line 22 between the regions AA and BB. As shown in FIG. 6, the fold-line 22 is located at a position about two thirds of the distance between the left and right ends of the booksert 20. After this step, the product is configured as shown in FIG. 7 with the regions AA and BB overlapping one another.

Second, glue spots 24 and 25 are provided on the surface of the region AA. Preferably, the glue spots 24 and 25 are made with a pressure sensitive a glue.

Third, the booksert 20 is folded at a fold-line 23 between the regions AA/BB and CC. As shown in FIG. 7, the fold-line 23 is located at a position about one half of the distance between the left and right ends of the booksert 20. At this stage, the product is configured as shown in FIG. 8 with all of the regions AA, BB and CC overlapping one another and held together via the glue spots 24 and 25.

The final product shown in FIG. 8 can be easily handled and stored. In order to use the product, the product can be opened by manually pulling the region CC to overcome the adherence at the glue spots 24 and 25 to separate regions AA and CC. Then, the booksert can be unfolded to a configuration like that shown in FIG. 6. In one preferred embodiment, the front of the final product (on the region CC) can have printed information identifying the contents of the folded booksert and the back of the final product (behind the region BB) can have a bar code or other identification.

The preferred embodiments of the present invention have a variety of advantages and uses. For example, because the product: created as a booksert with multiple pages, it is simple to handle and to use. The booksert 20 can provide convenient and easy to access printed information for a user. It can be highly beneficial for use with commercial products, such as drug products or the like, wherein printed information is necessary or desired. In addition, the removable insert 30 can also provide a variety of benefits and advantages. For example, the removable insert enables certain information to be easily separated from the remainder of the booksert. In exemplary embodiments, the removable insert may comprise a coupon or a rebate form.

Figure 9A:
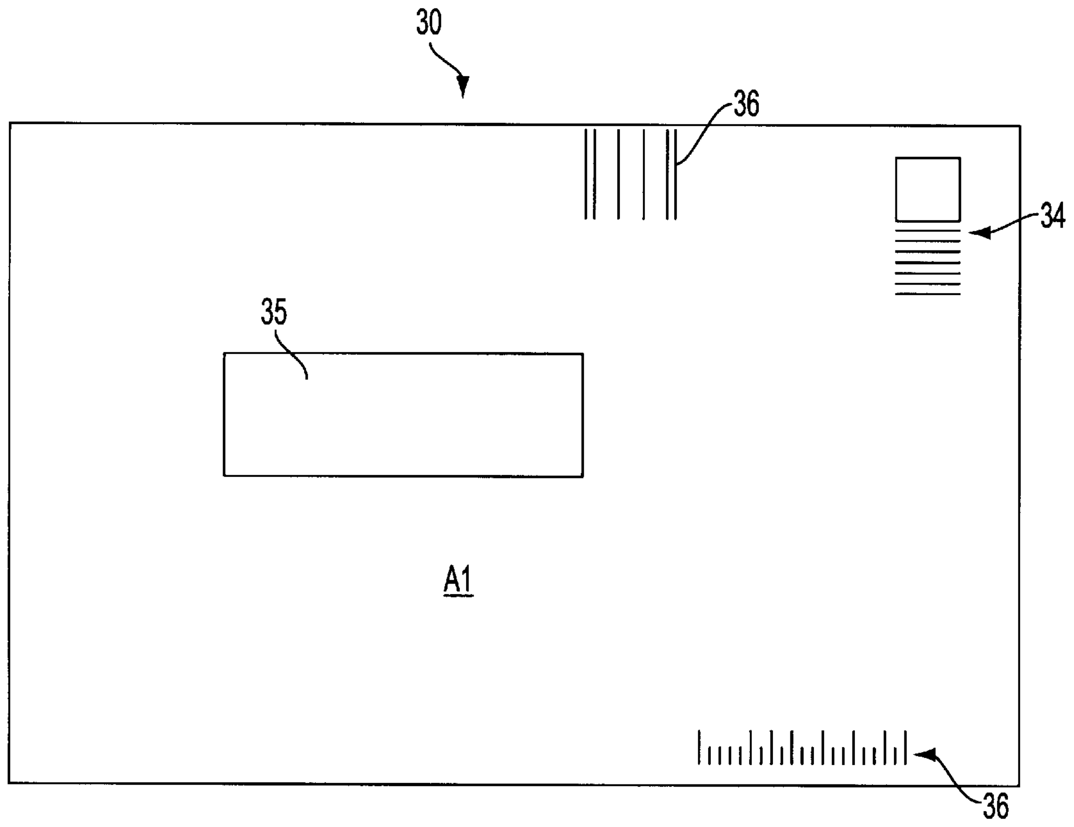
FIG. 9(A) is a top plan view of an exemplary embodiment of the removable insert.
Figure 9B:
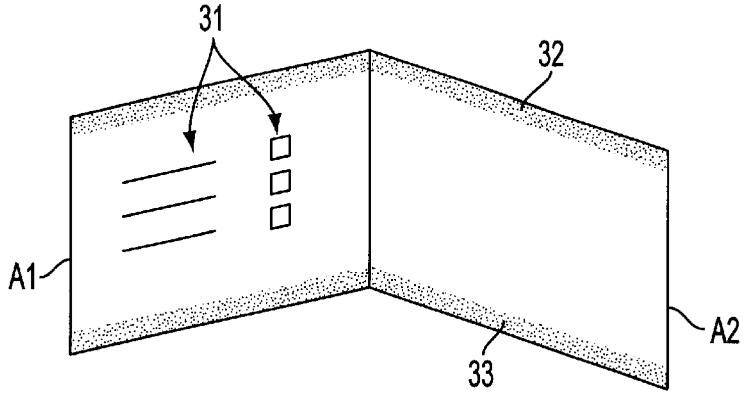
FIG. 9(B) is an elevational side view of the insert shown in FIG. 9(A)

In an exemplary embodiment shown in FIGS. 9(A)–9(B), the insert 30 can be used as a separate business reply mail portion. In this embodiment, the insert 30 can be used to receive, for example, customer information, product information, warranty information, or customer opinions or survey information. Preferably, the interior between the sides A1 and A2 of the folded region A contains areas 31 configured for customers to write information with a pen or pencil. By providing these areas 31 in this interior location, written information can be concealed upon folding the sides A1 and A2 against one another. In this regard, the upper and lower edges preferably have activatable glue strips 32 and 33 which can be used to seal the sides A1 and A2 together. The activatable glue strips can include a glue that becomes adhesive when desired, such as upon being moistened (e.g., such as used on common envelops).

As shown in FIG. 9(A), the front surface of the insert 30 can include stamp placement indicia 34 designating an area for receiving a postage stamp, return address indicia 35, and additional indicia 36 for bar code or other information.

Figure 10A:
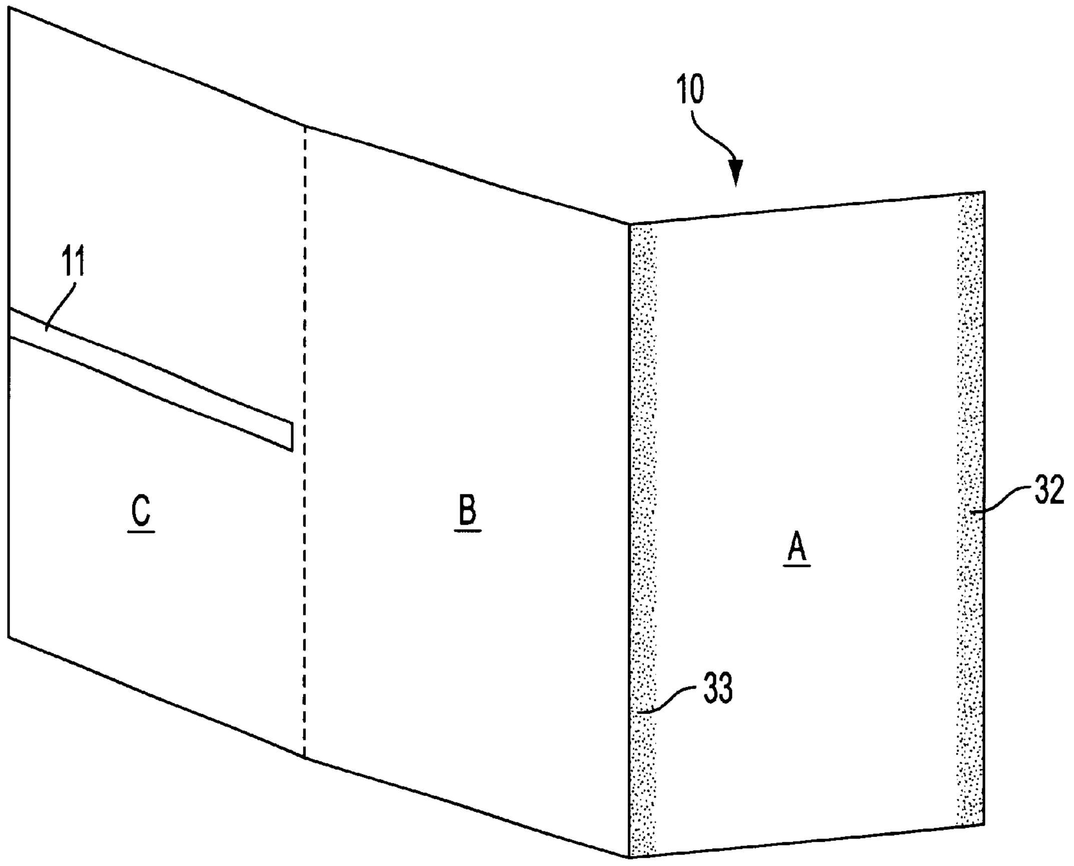
FIG. 10(A) is an elevational side view of a sheet used to create a booksert according to a first construction.
Figure 10B:
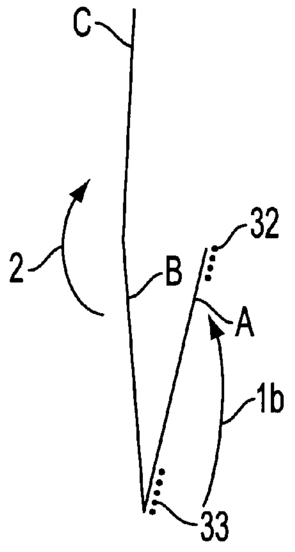
FIGS. 10(B) and 10(C) are schematic diagrams showing steps for folding the sheet shown in FIG. 10(A)
Figure 10C:
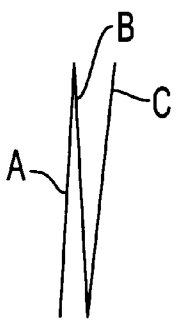
Figure 11A:
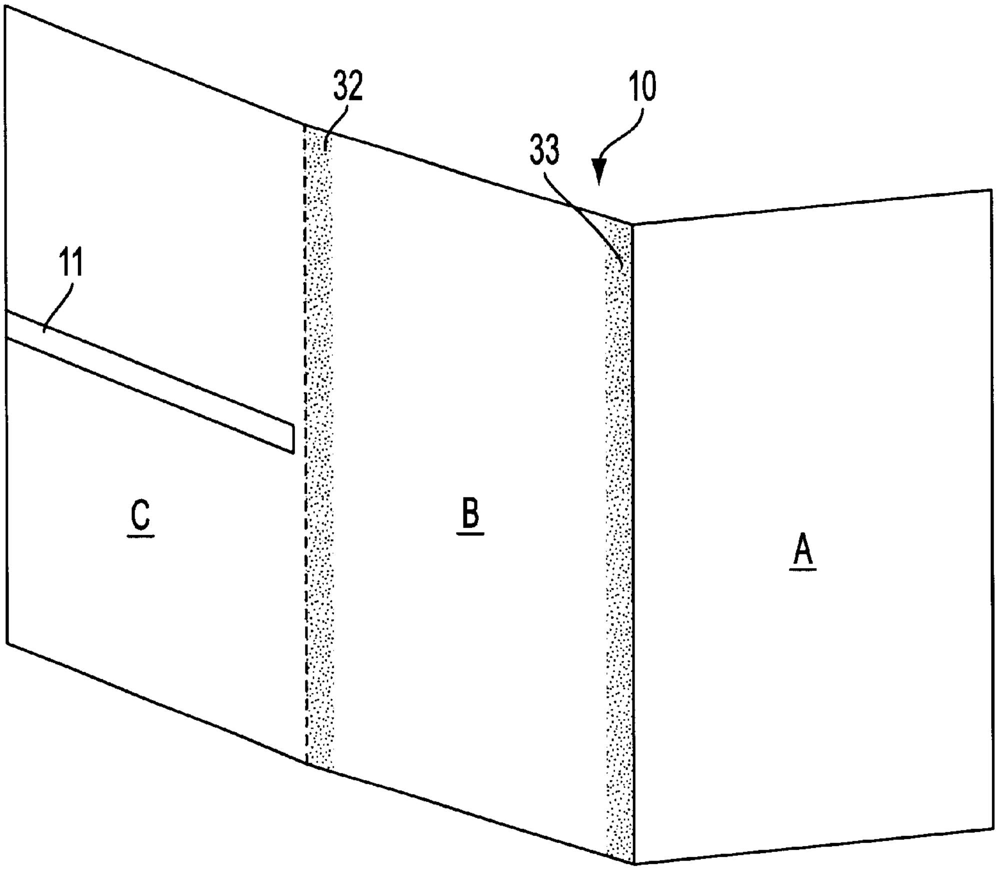
FIG. 11(A) is an elevational side view of a sheet used to create a booksert according to another construction of the invention.
Figure 11B:
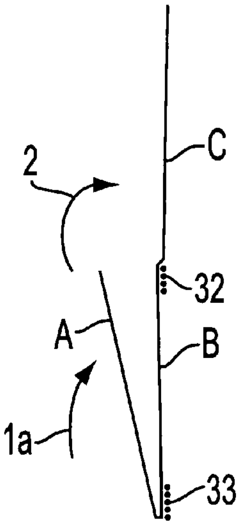
FIGS. 11(B) and 11(C) are schematic diagrams showing steps for folding the sheet shown in FIG. 11(A)
Figure 11C:
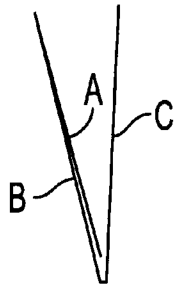

As discussed above, the arrows 1*a* and 1*b* in FIG. 1 illustrate that during construction the region A can be folded over the region B in either a rearward direction 1*b* or a forward direction 1*a*. FIGS. 10(A)–10(C) illustrate folding in the rearward direction 1*b*. FIGS. 11(A)–11(C) illustrate folding in the forward direction 1*a*. As shown in FIG. 10(B), the sheet can first be folded in the direction 1*b* and then folded in the direction 2 to a folded position shown in FIG. 10(C). If the device is used to create an insert 30 like that shown in FIG. 9(A), the activatable glue strips 32 and 33 can be initially applied as shown in FIGS. 10(A) and 10(B). Similarly, as shown in FIG. 11(B), the sheet can first be folded in the direction 1*a* and then folded in the direction 2 to a folded position shown in FIG. 11(C). If the device is used to create an insert 30 like that shown in FIG. 9(A), the activatable glue strips 32 and 33 can be initially applied as shown in FIGS. 11(A) and 11(B) with the glue strips 32 and 33 on an opposite side of the sheet 10 from the glue strip 11.

Figure 12A:
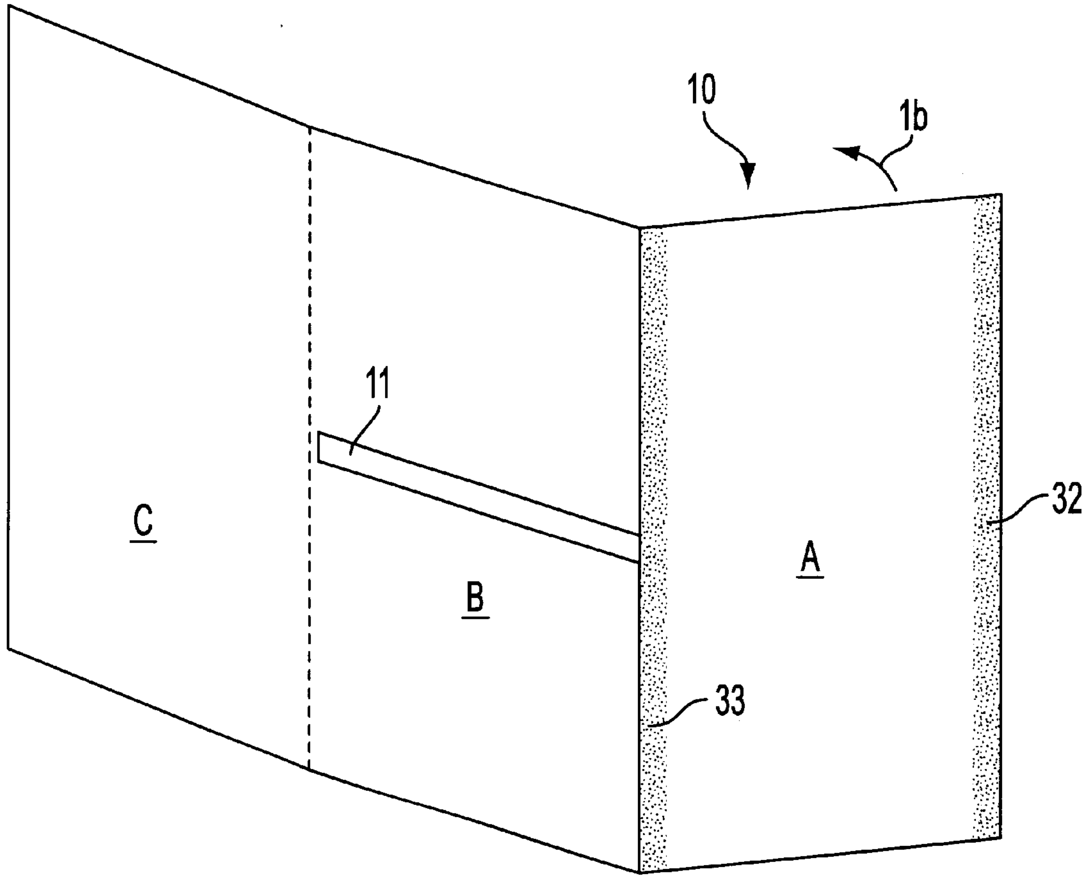
FIG. 12(A) is an elevational side view of a sheet used to create a booksert according to another construction of the invention.
Figure 12B:
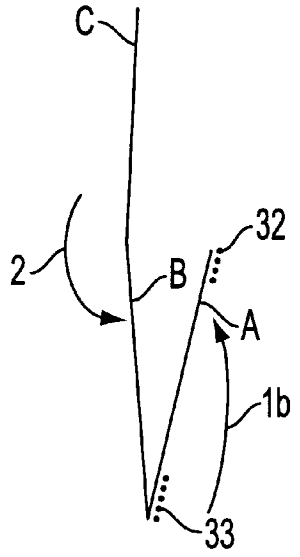
FIGS. 12(B) and 12(C) are schematic diagrams showing steps for folding the sheet shown in FIG. 12(A)
Figure 12C:
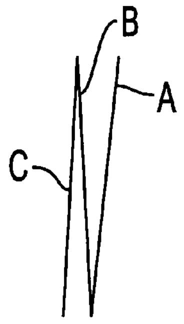

FIGS. 12(A)–12(C) show another embodiment wherein a glue strip 11 is applied along the central region B. In this embodiment, the region A is then folded in the direction 1*b* and the region C is then folded in the direction 2 shown in FIG. 12(B) to a position as shown in FIG. 12(C). Thereafter, the booksert can be completed in a manner similar to that described above with reference to, for example, FIGS. 3–5. If the device is used to create an insert 30 like that shown in FIG. 9(A), the activatable glue strips 32 and 33 can be initially applied as shown in the FIGS.

According to yet other embodiments, the booksert of the invention may be constructed without a removable insert. FIGS. 13–28 illustrate other exemplary embodiments of the invention demonstrating other bookserts and methods of manufacturing the same.

FIGS. 13–17 show a method of manufacturing a twelve page booksert 200 from a folded, glued and trimmed single sheet of material. The method includes the following steps.

Figure 13:
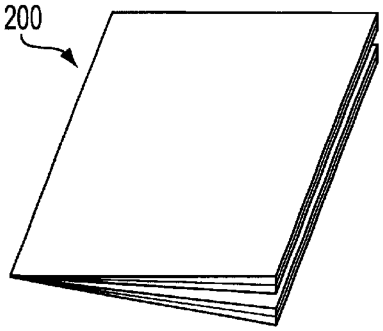
FIG. 13 is a perspective view of a twelve page booksert according to another embodiment of the invention.
Figure 14:
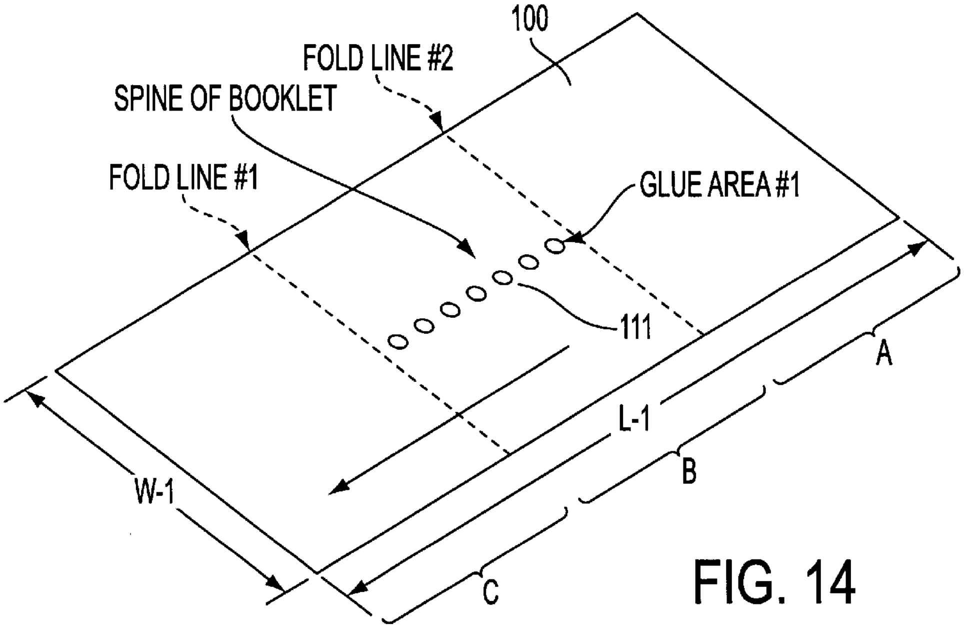
FIG. 14 is a perspective diagram showing a first stage of manufacturing the booksert shown in FIG. 13.

First, a glue strip 111 is applied along a center of a region B. In FIG. 13, the glue strip 111 extends along about one third of the length of the upper surface of the sheet 100.

Figure 15:
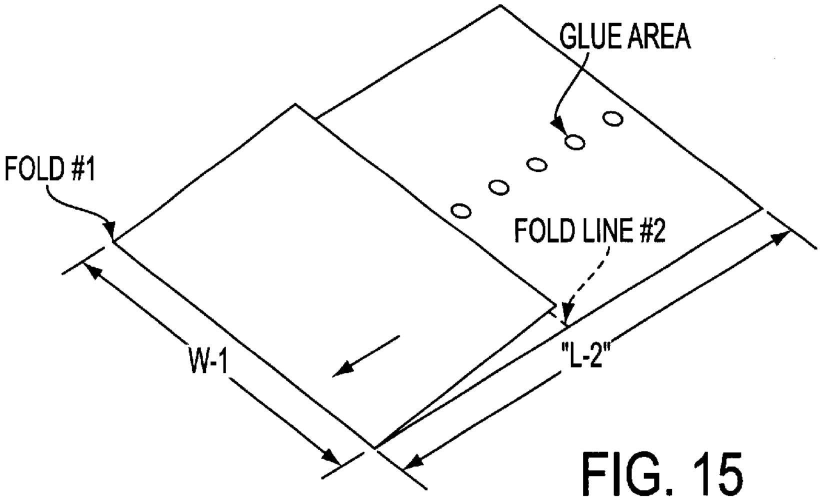
FIG. 15 is a perspective diagram showing a second stage of manufacturing the booksert shown in FIG. 13.

Second, the sheet 100 is folded at a fold-line #1 between the regions C and B. In FIG. 13, the fold-line #1 is located at a position about one third of the distance between the left and right ends of the sheet 100. After this step, the product is configured as shown in FIG. 15 with regions C and B overlapping one another.

Figure 16:
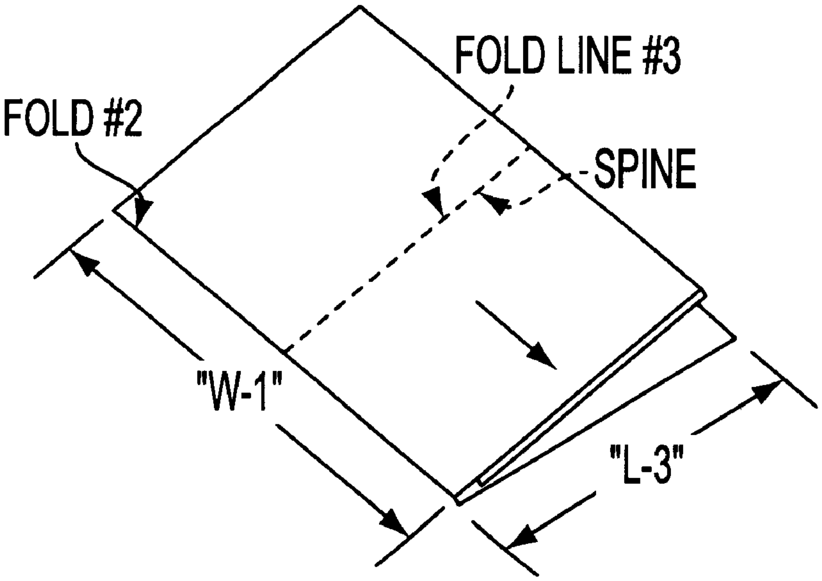
FIG. 16 is a perspective diagram showing a third stage of manufacturing the booksert shown in FIG. 13.

Third, a glue strip 112 is applied along the center of the region A (this can also be applied at the same time as the application of the glue strip 111). The sheet 100 is then folded at a fold-line #2 between the regions A and B/C. In FIG. 15, the fold-line #2 is located at a position about one half of the distance between the left and right ends of the sheet 100. After this stage, the product is configured as shown in FIG. 16 with all of the regions A, B and C overlapping one another. As a result, all of the sheets are connected together at the central glue regions 111 and 112.

Figure 17:
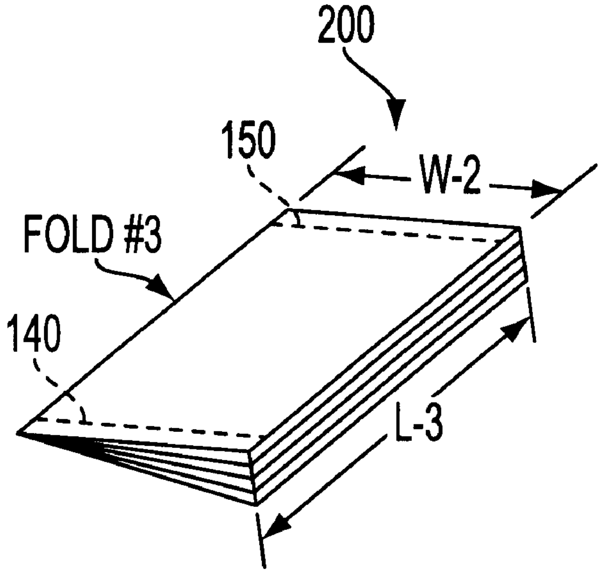
FIG. 17 is a perspective diagram showing a fourth stage of manufacturing the booksert shown in FIG. 13.
Figure 18:
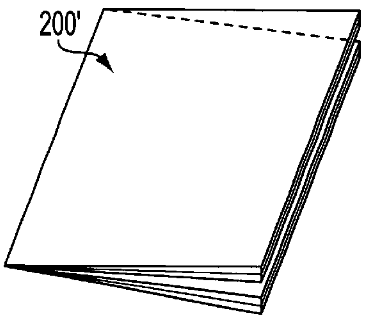
FIG. 18 is a perspective view of a sixteen page booksert according to another embodiment of the invention.

Fourth, then the booksert is folded around the fold-line #3 so that it assumes the configuration shown in FIG. 17. At that time, the side edges 140 and 150 (shown with dashed lines) are trimmed off to form the booksert 200. This trimming action separates the regions A, B and C by removing the connections along the fold-lines to form separate sheets. This trimming action also ensures that the pages of the booksert are aligned along their edges.

In this manner, an integral booksert having 12 pages is easily formed from a single sheet of material. The final size and shape of the booksert can be selected as desired. However, the present invention advantageously enables the easy fabrication of small bookserts that can be used along with products and the like. For example, the product shown in FIG. 17 can be formed, in one exemplary construction, to have a length L-3 of about 3 ½ to 4 inches and a width W-2 of about 2 ½ to 3 inches.

FIGS. 18–22 show a method of manufacturing a sixteen page booksert 200' from a single sheet of material. The method includes the following steps.

Figure 19:
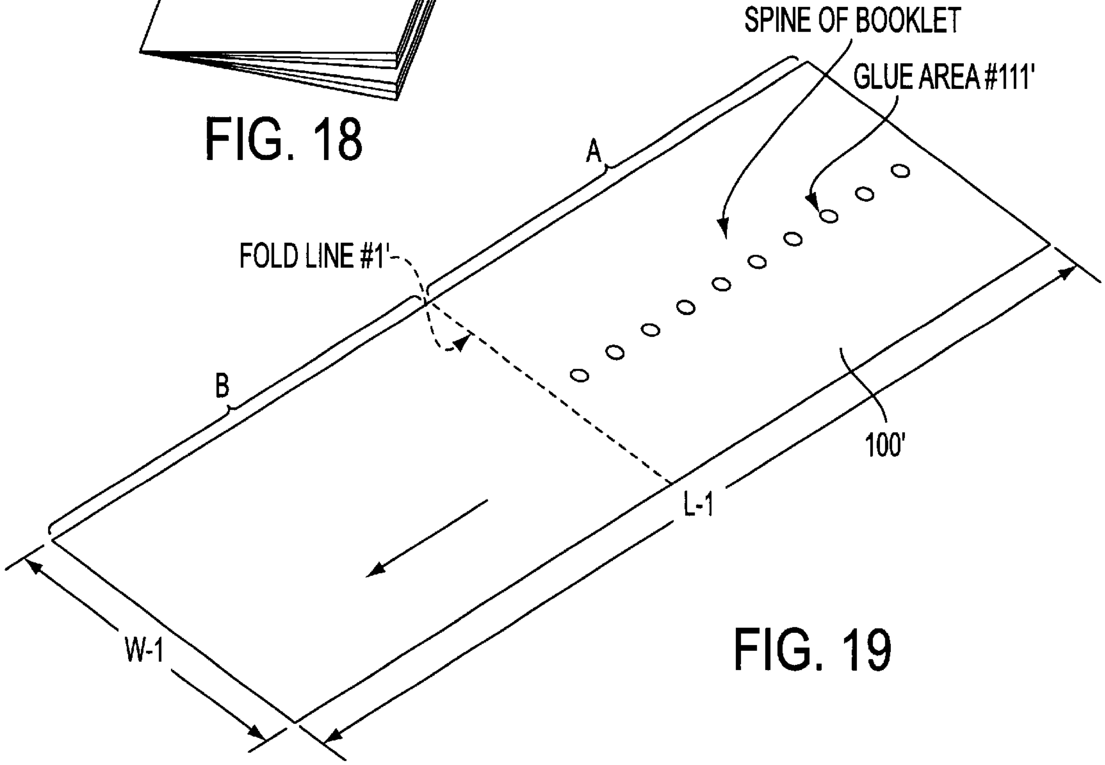
FIG. 19 is a perspective diagram showing a first stage of manufacturing the booksert shown in FIG. 18.

First, a glue strip 111' is applied along a center of the region A. In FIG. 19, the glue strip 111' extends along about one half of the length of the upper surface of the sheet 100'.

Figure 20:
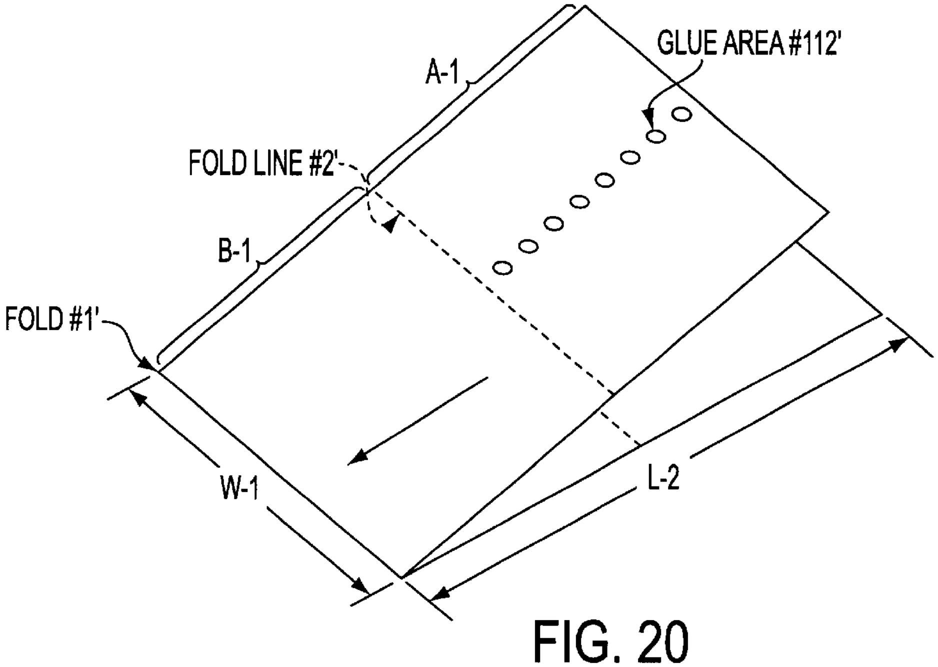
FIG. 20 is a perspective diagram showing a second stage of manufacturing the booksert shown in FIG. 18.

Second, the sheet 100' is folded at a fold-line #1' between the regions A and B. In FIG. 19, the fold-line #1' is located a position about one half of the distance between the left and right ends of the sheet 100'. After this step, the product is configured as shown in FIG. 20 with regions A and B overlapping one another.

Figure 21:
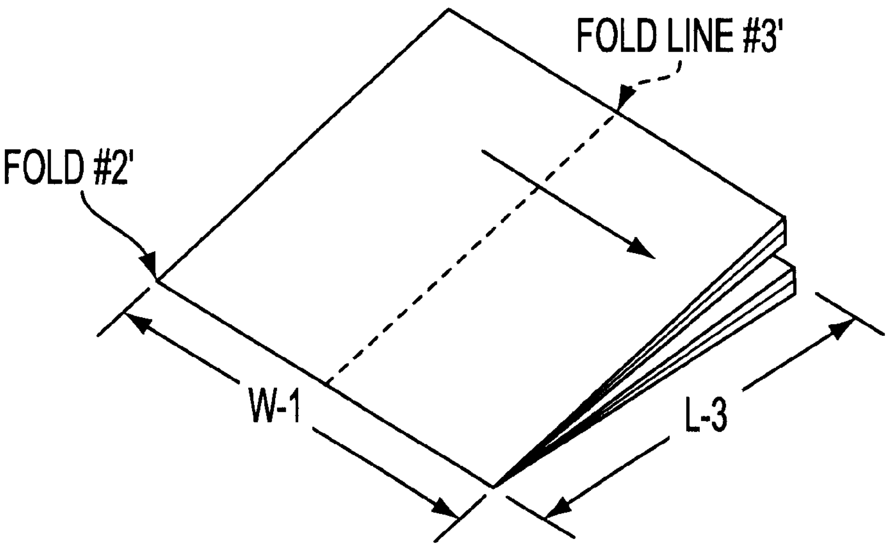
FIG. 21 is a perspective diagram showing a third stage of manufacturing the booksert shown in FIG. 18.

Third, a glue strip 112' is applied along the center of the region A-1 (this could also be applied at the same time as the application of the glue strip 111'). The sheet 100' is then folded at a fold-line #2' between the regions A-1 and B-1. In FIG. 20, the fold-line #2' is located at a position about one half of the distance between the left and right ends of the sheet 100'. After this stage, the product is configured as shown in FIG. 21 with all of the regions A-1 and B-1 overlapping one another. As a result, all of the sheets are connected together at the central glue regions 111' and 112'.

Figure 22:
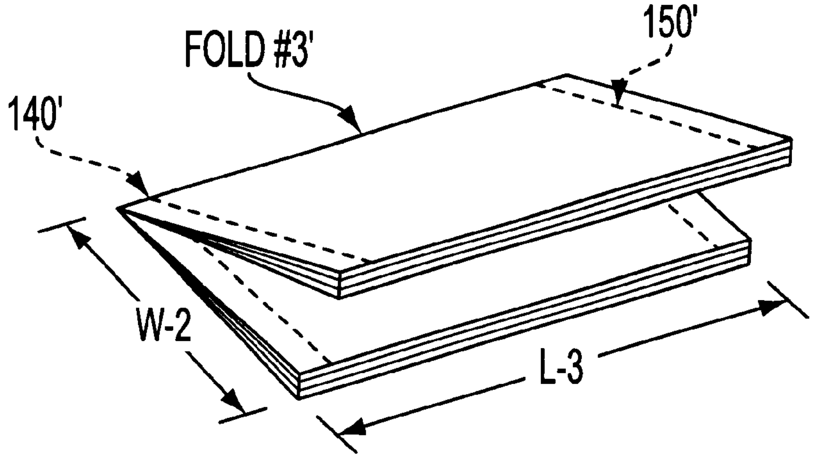
FIG. 22 is a perspective diagram showing a fourth stage of manufacturing the booksert shown in FIG. 18.
Figure 23:
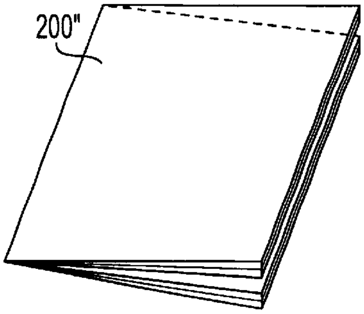
FIG. 23 is a perspective view of a twenty-four page booksert according to another embodiment of the invention.

Fourth, then the booksert is folded around the fold-line #3' so that it assumes the configuration shown in FIG. 22. At that time, the side edges 140' and 150' (shown with dashed lines) are trimmed off to form the booksert 200'. This trimming action separates the regions A, B, A-1, B-1 by removing the connections along the fold-lines to form separate sheets. This trimming action also ensures that the pages of the booksert are aligned along their edges.

In this manner, an integral booksert having 16 pages is easily formed from a single sheet of material. The final size and shape of the booksert can be selected as desired. However, the present invention advantageously enables the easy fabrication of small bookserts that can be used along with products and the like. For example, the product shown in FIG. 22 can be formed, to have a length L-3 and a width W-2 sized like that of a 12 page booksert as discussed above.

FIGS. 23–28 show a method of manufacturing a twenty-four page booksert 200" from a single sheet of material. The method includes the following steps.

First, a glue strip 111" is applied along a center of the region A. In FIG. 19, the glue strip 111" extends along about one half of the length of the upper surface of the sheet 100".

Figure 24:
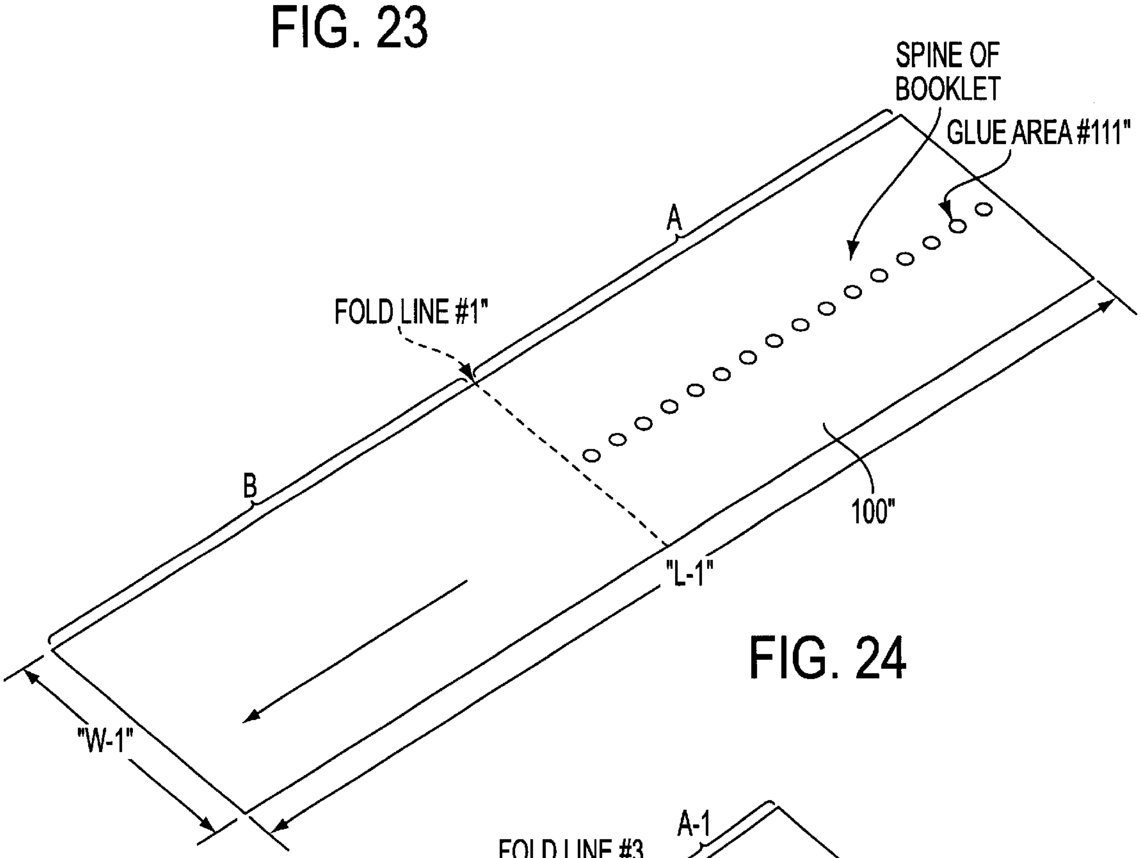
FIG. 24 is a perspective diagram showing a first stage of manufacturing the booksert shown in FIG. 23.
Figure 25:
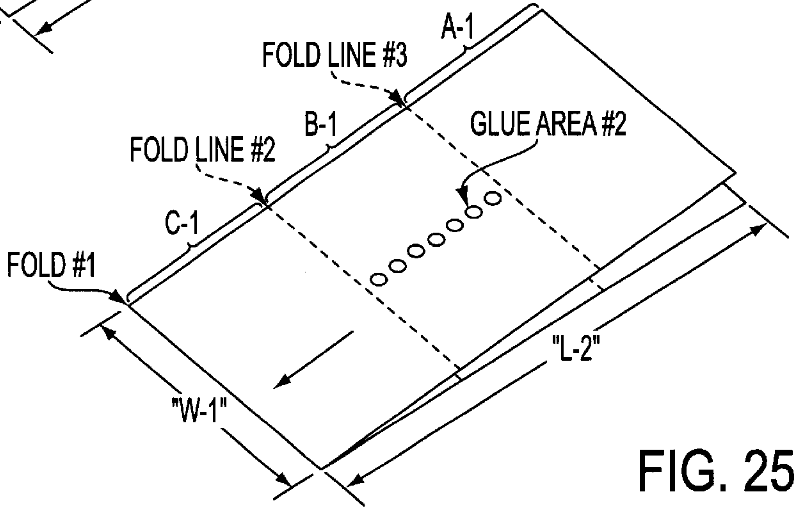
FIG. 25 is a perspective diagram showing a second stage of manufacturing the booksert shown in FIG. 23.

Second, the sheet 100" is folded at a fold-line #1" between the regions A and B. In FIG. 24, the fold-line #1" is located at a position about one half of the distance between the left and right ends of the sheet 100". After this step, the product is configured as shown in FIG. 25 with regions A and B overlapping one another.

Figure 26:
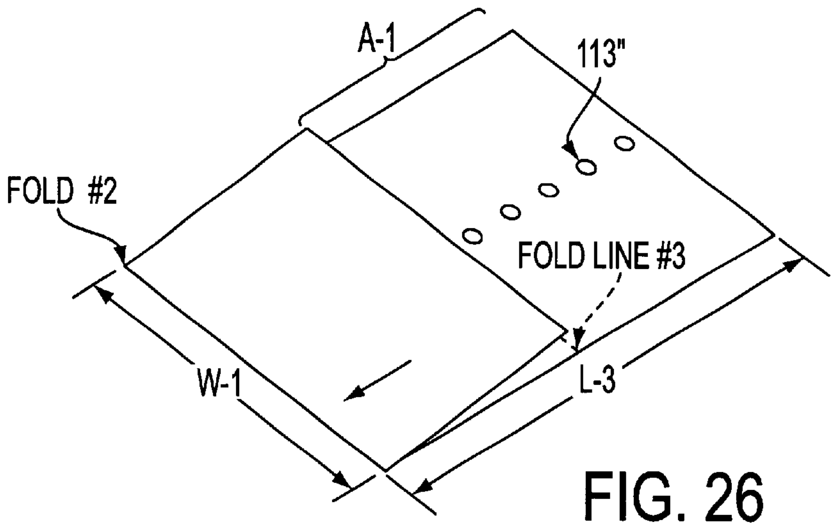
FIG. 26 is a perspective diagram showing a third stage of manufacturing the booksert shown in FIG. 23.

Third, a glue strip 112" is applied along the center of the region B-1 (this can also be applied at the same time as the application of the glue strip 111"). The sheet 100" is then folded at a fold-line #2" between the regions C-1 and B-1. As shown in FIG. 25, the fold-line #2" is located at a position about one third of the distance between the left and right ends of the sheet 100". After this stage, the product is configured as shown in FIG. 26 with all of the regions C-1 and B-1 overlapping one another.

Figure 27:
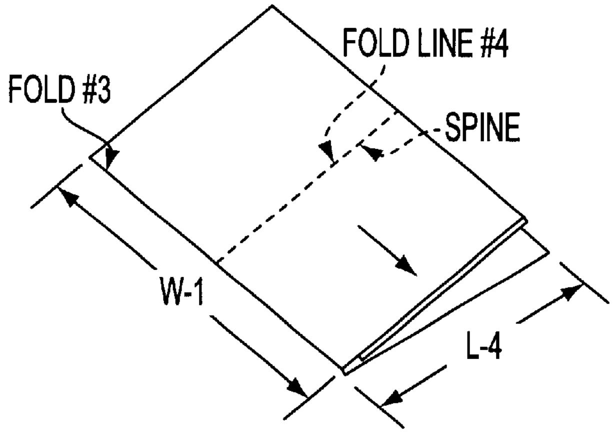
FIG. 27 is a perspective diagram showing a fourth stage of manufacturing the booksert shown in FIG. 23.

Fourth, a glue strip 113" is applied along the center of the region A-1 (this can also be applied at the same time as the application of the glue strip 111" and/or the glue strip 112"). The sheet 100" is then folded at a fold-line #3" between the regions A-1 and C-1/B-1. In FIG. 26, the fold-line #3" is located at a position about one half of the distance between the left and right ends of the sheet 100". After this stage, the product is configured as shown in FIG. 27 with all of the regions A, B, A-1, B-1, C-1 overlapping one another. As a result, all of the sheets are connected together at the central glue regions 111", 112" and 113".

Figure 28:
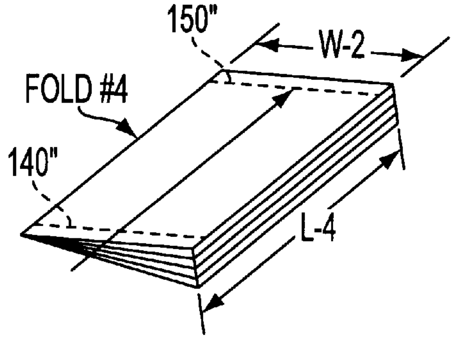
FIG. 28 is a perspective diagram showing a fifth stage of manufacturing the booksert shown in FIG. 23.

Fifth, then the booksert is folded around the fold-line #4" so that it assumes the configuration shown in FIG. 28. At that time, the side edges 140" and 150" (shown with dashed lines) are trimmed off to form the booksert 200". This trimming action separates the regions A, B, A-1, B-1, C-1 by removing the connections along the fold-lines to form separate sheets. This trimming action also ensures that the pages of the booksert are aligned along their edges.

In this manner, an integral booksert having 24 pages is easily formed from a single sheet of material. The final size and shape of the booksert can be selected as desired. However, the present invention advantageously enables the easy fabrication of small bookserts that can be used along with products and the like. For example, the product shown in FIG. 22 can be formed, to have a length L-4 and a width W-2 sized like that of the length and width of a 12 page booksert as discussed above.

The various embodiments of present invention enable the creation of a booksert which can be easily and efficiently manufactured.

First, print (e.g., words and/or illustrations) can be placed on individual sheets of material. The print can be arranged on the sheets so that regions of each single sheet will correspond to designated pages after formation of the booksert. Then, the gluing and folding steps can be carried out on the individual sheets as described above. These bookserts can thus be easily manufactured. Handling of multiple sheets is not required, but less preferred embodiments could be manufactured with two or more initial sheets.

Bookserts can be easily fabricated in-line and without staples, avoiding the risks of puncturing tubes or devices. Scratching is not a problem. In addition, bookserts can have more room for print or copying.

While bookserts can be made in various sizes, the preferred embodiments involve small bookserts that can be easily provided along with commercial products and especially along with drug products. For example, the bookserts can be (a) attached to containers having products (e.g., drug products) therein, (b) placed within bags, cartons or the like having products (e.g., drug products) or product-filled containers therein, or (c) provided along with products (e.g., drug products) at point of sale or the like. In preferred embodiments, bookserts are used along with drug products for providing information related thereto, such as when a purchaser obtains such drug products from a pharmacy or the like.

While the preferred embodiments of the invention have been disclosed in detail above, the invention is not intended to be limited to the embodiments as disclosed. Those skilled in the art may make numerous uses and modifications of and departures from the specific embodiments described herein without departing from the inventive concepts. As some examples, while preferred embodiments have been described, it is contemplated that bookserts having various other numbers of pages can be made using principles of the invention as described. For example, bookserts having more pages can be made. And, bookserts having as little as 8 pages made—e.g., by folding over a single fold between two regions A and B. In addition, in the embodiments with removable inserts, the booksert portions and the insert portions can be made to have various numbers of pages using the principles of this invention. In addition, the various gluing and folding steps can be modified or altered by those in the art without departing from the spirit of the claimed invention.

What is claimed is:

1. A method of manufacturing a booksert having a removable insert, comprising the steps of:

providing a single generally rectangular sheet of material, said sheet having at least three generally equal-size regions;

providing a glue strip along a first of said regions;

folding a third of said regions with respect to a second of said regions over a first fold-line such that said second and third regions overlap one another but are not adhered to one another;

folding said second region with respect to said first region over a second fold-line such that said second region overlaps said first region and is adhered to said first region along said glue strip;

trimming said booksert along said first and second fold-lines;

folding said booksert over an axis through said glue strip;

whereby a booksert having a removable insert is created.

2. The method of claim 1, wherein said step of providing a glue strip includes providing said glue strip along a central axis of said first region and terminating proximate said second region.

3. The method of claim 1, wherein said first, second and third regions make up all of said equal-size regions.

4. The method of claim 1, further including the steps of forming said booksert with eight or more pages and forming said removable insert with four pages.

5. The method of claim 1, further including the step of further folding said booksert into a smaller final configuration by folding said booksert over a fourth fold line.

6. The method of claim 5, further including the step of further folding said booksert into an even smaller final configuration by folding said booksert over a fifth fold line.

7. The method of claim 6, further including the step of providing a pressure sensitive adhesive to a surface of said booksert prior to said step of folding over said fifth fold line, such that upon said step of folding said booksert over said fifth fold line said booksert is releasably maintained in said final configuration by said adhesive.

8. The method of claim 1, further including the step of providing said removable booksert with a width parallel to said glue strip of about 3 to 4 inches and a length of about 4 to 5 inches.

9. The method of claim 1, further including the step of providing said removable insert as a coupon.

10. The method of claim 1, further including the step of providing said removable insert as a business reply mail portion.

11. The method of claim 10, further including the step of providing said business reply mail portion has designated areas receiving written customer information.

12. The method of claim 11, further including providing said designated areas at an interior location that can be concealed upon folding sides of said business reply mail portion against one another.

13. The method of claim 11, further including providing an activatable glue strips along said business reply mail portion to seal the sides together.

14. The method of claim 11, further including the step of printing information on said sheet pertaining to a commercial product prior to forming said sheet into said booksert.

* * * * *